United States Patent [19]

Subrizi et al.

[11] 4,268,901

[45] May 19, 1981

[54] VARIABLE CONFIGURATION ACCOUNTING MACHINE WITH AUTOMATIC IDENTIFICATION OF THE NUMBER AND TYPE OF CONNECTED PERIPHERAL UNITS

[75] Inventors: Angelo Subrizi; Ettore Violino, both of Ivrea, Italy

[73] Assignee: Ing. C. Olivetti & C., S.p.A., Ivrea, Italy

[21] Appl. No.: 606,394

[22] Filed: Aug. 21, 1975

[30] Foreign Application Priority Data

Sep. 18, 1974 [IT] Italy ............................... 69812 A/74

[51] Int. Cl.³ .................. G06F 9/06; G06F 13/00
[52] U.S. Cl. .................................................. 364/200
[58] Field of Search ................. 340/172.5; 445/1; 364/200 MS File, 900 MS File

[56] References Cited

U.S. PATENT DOCUMENTS

| | | | |
|---|---|---|---|
| 3,238,510 | 3/1966 | Ergott, Jr. .................. | 340/172.5 |
| 3,317,898 | 5/1967 | Hellerman .................. | 340/172.5 |
| 3,390,379 | 6/1968 | Carlson et al. ............. | 340/172.5 |
| 3,631,403 | 12/1971 | Asbo et al. ................. | 340/172.5 |
| 3,686,637 | 8/1972 | Zachar et al. .............. | 340/172.5 |
| 3,748,452 | 7/1973 | Ruben ....................... | 340/172.5 X |

Primary Examiner—Melvin B. Chapnick

[57] ABSTRACT

A variable configuration accounting machine having a central processor unit (CPU) of an LSI (Large Scale Integration) microprocessor type and a plurality of peripheral units selectively connectable to the CPU which gives a selected configuration to the machine. The CPU is connected to a pair of memories. The first memory stores instructions and data, and the second memory stores microprograms. The capacity of both memories is variable according to the number and type of the peripheral units connected to the CPU for a given configuration of the machine. In the second memory is permanently stored an initialization microprogram that, when activated by the operator, automatically causes the identification by the CPU of the number and type of peripheral units connected to the CPU. Moreover, the initialization microprogram controls the CPU to define a reserved zone in the first memory not accessible to the instructions and accessible to the CPU as controlled by the microprograms, for storing data relating to the execution of the instructions and obtaining the maximum of the first memory for storing programs by defining the size of the reserved zone as a function of the number and type of the peripheral units identified.

8 Claims, 9 Drawing Figures

| 00 | 01 | 02 MICRO | 03 PROGRAM | 04 STACK | 05 | 06 | 07 |
|---|---|---|---|---|---|---|---|
| 08 | 09 | 0A | 0B | 0C | 0D | 0E | 0F |
| 10 | 11 | 12 KEYBOARD | 13 | 14 BUFFER | 15 | 16 | 17 |
| 18 | 19 | 1A | 1B | 1C | 1D | 1E | 1F |
| 20 | 21 | 22 IPREV- | 23 101 | 24 ICAR- | 25 102 | 26 BUFSTA | 27 |
| 28 | 29 | 2A PRINTING | 2B | 2C BUFFER | 2D | 2E | 2F |
| 30 | 31 | 32 | 33 | 34 | 35 | 36 | 37 |
| 38 | 39 | 3A | 3B | 3C | 3D | 3E | 3F |
| 40 IFEED | 41 IPAG | 42 AP3-104 COMOD | 43 CC1 | 44 | 45 CONT-105 | 46 | 47 CC2 |
| 48 C4 | 49 | 4A | 4B BYTE 1 | 4C BYTE 2 | 4D PRELST AP2 | 4E | 4F SERV |
| 50 TABN | 51 LUND | 52 LUNS | 53 NSPRO | 54 NSCHE | 55 CARV | 56 LPAG | 57 QPAG |
| 58 LFEED | 59 QFEED | 5A ACC3 | 5B DEMI-106 | 5C | 5D | 5E DEVIP+1 | 5F RB-100 |
| 60 INDI | 61 | 62 PLC | 63 | 64 POINTER 1 | 65 | 66 POINTER 2 | 67 |
| 68 RECO | 69 | 6A | 6B | 6C FILL | 6D LAMP1 | 6E SC | 6F |
| 70 STKPRO | 71 | 72 | 73 PROGRAM | 74 STACK | 75 | 76 | 77 |
| 78 REGR | 79 | 7A AUX | 7B REGISTER | 7C | 7D | 7E | 7F ULTR |
| 80 TABU | 81 TABOPE | 82 TABPAP | 83 LMEM | 84 CONTROL | 85 AREA | 86 | 87 |

VARIABLE CONFIGURATION ACCOUNTING MACHINE WITH AUTOMATIC IDENTIFICATION OF THE NUMBER AND TYPE OF CONNECTED PERIPHERAL UNITS

BACKGROUND OF THE INVENTION

The present invention relates to an electronic accounting machine of variable configuration comprising a device for automatically initializing the machine on the basis of the number and type of peripherals connected thereto.

As is known, accounting machines may have a plurality of configurations according to the kind of application for which they are intended. More particularly, each configuration depends on the number of peripheral units connected to the basic machine, such as magnetic tape readers, paper tape punch/readers, etc. For each configuration it is necessary to define a reserved zone of the memory at the disposal of the supervisory program and not accessible to the user program for recording the information which concerns the exchange of data with the connected peripheral units.

The problem for medium-large computers is solved by using one or more computers of lesser power (channel controller) for handling the conversation with the peripheral units.

Some electronic accounting machines of medium power, on the other hand, define a memory zone capable of handling the maximum number of peripheral units which can be connected and, in the case of a smaller number of peripherals, much of this zone remains unutilized. Since this unutilized zone occupies only a very small fraction of the capacity of the memory available to the programer, the problem of optimizing the dimensions of the reserved memory zone does not exist.

In the case of small-sized accounting machines there is the problem of optimizing the dimensions of the reserved zone as a function of the number and type of peripheral units connected. In fact, for such machines it is a very frequent occurrence to vary the configuration of the peripheral units as a function of the scope of the services required. Therefore, a machine may be extended at the premises of the user by adding or substituting peripherals. If there were always a reserved zone sufficiently large for the maximum configuration, a conflict exists between, on the one hand, defining a reserved zone capable of handling the maximum number of peripherals and of, on the other hand, providing a memory of a sensible size for connecting the minimum number of peripherals required by the particular application.

In this case, since the memory available to the user is the difference between the capacity of the memory and the reserved zone, the former would be insufficient to contain the programs required even for the minimum configurations. Therefore, the capacity of the memory must be extended and the memory would not be fully utilized.

The object of this invention is therefore to overcome such problems.

SUMMARY OF THE INVENTION

According to the present invention there is provided a variable configuration accounting machine comprising a first memory for recording data and instructions adapted to define predetermined operations of the accounting machine, a second memory for storing microprograms adapted to execute the instructions, a central unit for executing the microprograms, a plurality of peripheral units which can be connected to the central unit to define various configurations of the accounting machine, a reserved zone of the first memory not accessible to the instructions and accessible to the central unit as controlled by the microprograms for storing data relating to the execution of the instructions, means for identifying the number and the type of peripheral units connected to the central unit, and means for defining the capacity of the reserved zone as a function of the number and type of the peripheral units so identified. Moreover, for each configuration of peripheral units there may be required a memory accessible to the user which has dimensions variable as a function of particular kinds of application. There also exists, therefore, the problem of recognizing automatically the size of the memory available. In fact, such recognition is necessary for signalling the overflow of memory by the machine.

Accordingly the first memory may be made up of a variable number of modules, means being provided for defining the number of modules included in the first memory.

BRIEF DESCRIPTION OF THE DRAWINGS

The invention will be described in more detail, by way of example, with reference to the accompanying drawings, wherein.

DETAILED DESCRIPTION OF THE PREFERRED EMBODIMENT

Figure 1:
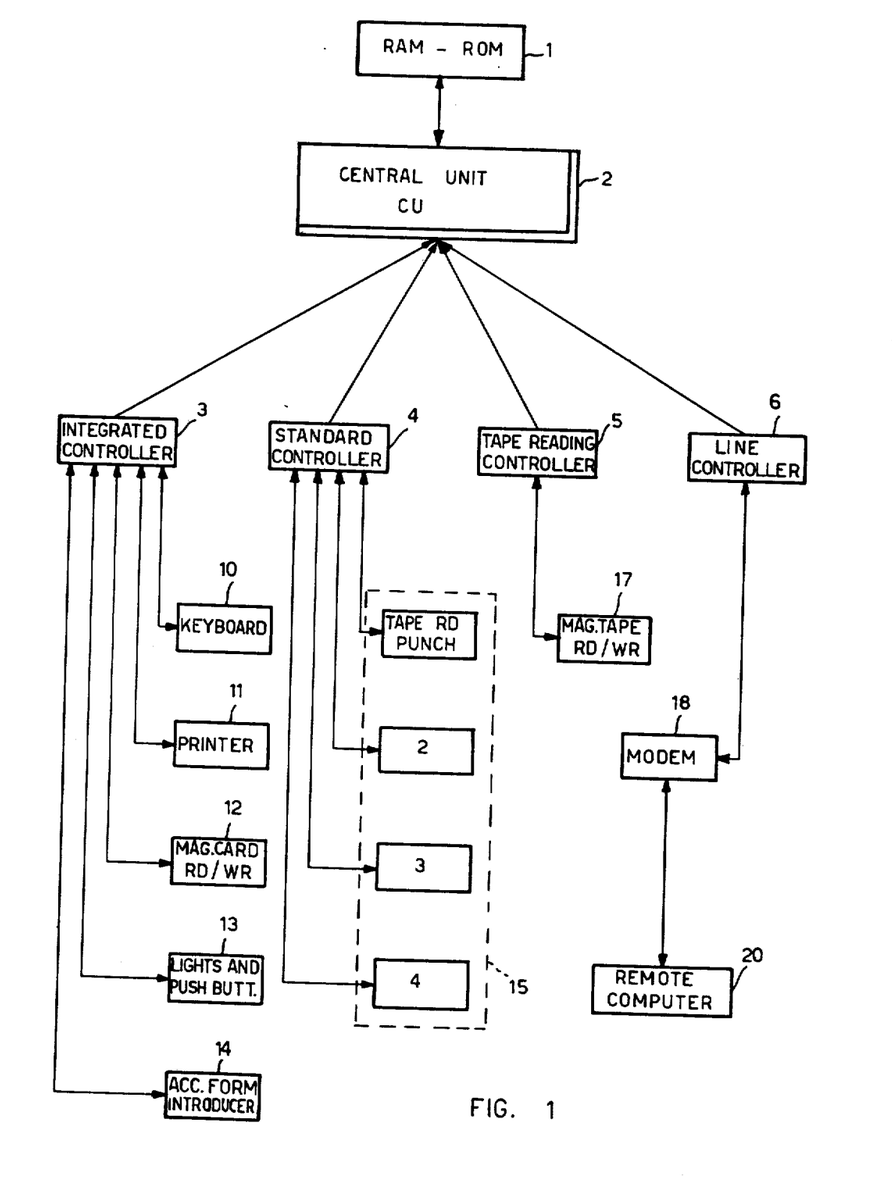
FIG. 1 is a block diagram of an accounting machine embodying the invention.

Referring to FIG. 1, the accounting machine comprises a memory 1 divided into two zones, a RAM for recording the instructions and the data of the programs and a ROM for recording the microprograms adapted to implement the instructions and handle the peripherals. The memory 1 is connected via a data bus to a central data processing unit 2 adapted to execute the microinstructions read from time to time from the ROM.

The central unit 2 is connected to a group of control units. An integrated controller 3 handles the exchange of data between the CU (central unit) 2 and a keyboard 10, a printer 11, a magnetic card read/write device 12, a console 13 and an accounting form introducing device 14.

A standard controller 4 handles the exchange of data between the CU 2 and at the most four peripheral units 15 (for example, a tape read/punch unit), in addition to the peripherals handled by the controller 3.

A controller 5 handles the exchange of data between the CU 2 and a magnetic tape read/write unit 17.

A line controller 6 handles the exchange of data between the CU 2 and a signal modulator/demodulator (MODEM) 18 to allow connection between the accounting machine and a remote computer 20.

It is clear from FIG. 1 how it is possible to have various configurations of the accounting machine:

(1) Configuration for accounting applications involving simple invoicing. This is obtained by connecting only the controller 3 and its peripherals to the CU 2. The magnetic card is used only as program input. The memory available is of ½K byte, where K means approximately 1000.

(2) Configuration for collecting data. This is obtained from configuration 1 by adding the controller 4 if punched tape is used as the data carrier or by adding the controller 5 if magnetic tape is used. The memory available is of 1K byte or optionally of 2K bytes.

(3) Configuration for collecting data with connection to remote computer. This is obtained from configuration 2 by adding the line controller 6.

(4) Configuration with output for invoicing and accounting applications. This is obtained from configuration 1 by adding the microprograms to use the magnetic cards as data carriers. The memory available is of 1K byte or optionally of 2K bytes.

(5) Configuration with input/output for invoicing and accounting applications. This is the maximum configuration in which it is possible to read the information on an external carrier, process the data and record the results on another carrier.

A different set of microprograms is therefore required for each of these configurations.

Consequently, there is a different configuration of the memories for each of the five configurations. More particularly, the reserved zone (ZRM) is a function of the number of connected controllers, the microprogram memory (ROM) is a function of the number and type of peripherals and of the services performed, and the memory available to the user (RAM) is a function of the services performed.

Figure 2:
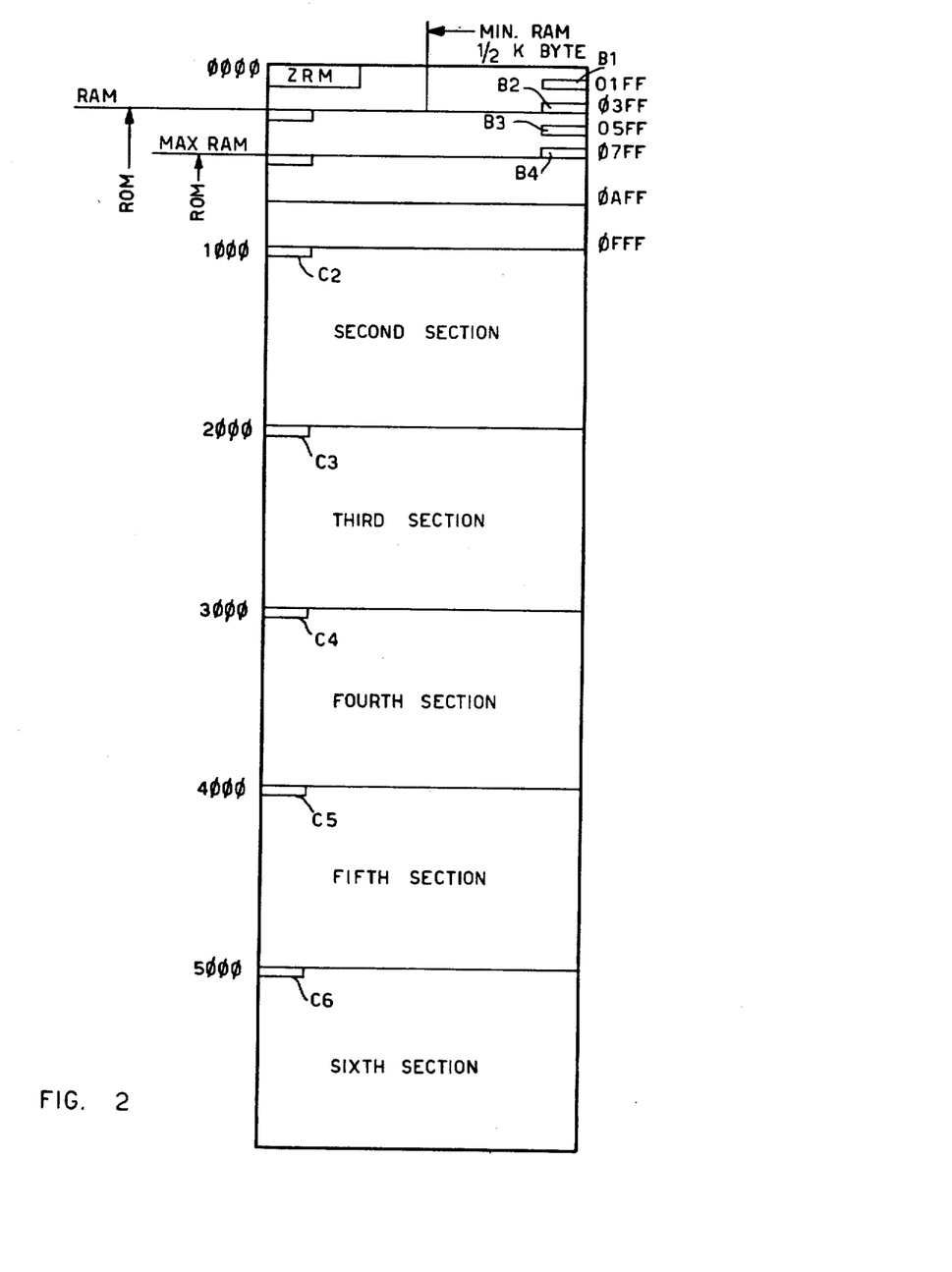
FIG. 2 is a diagram of the memory RAM/ROM.

Referring to FIG. 2, this shows the configuration of the memory 1 which is arranged in 8-bit bytes. It is to be noted that in the maximum configuration of RAM the first 2048 bytes (that is, up to the hexadecimal address $\phi$7FF) are used as the memory RAM, while the remainder are used as the memory ROM. Hexadecimal address digits run 0, 1 . . . 8, 9, A, B . . . E, F. 7FF is thus address $7 \cdot 16^2 + 15 \cdot 16^1 + 15 \cdot 16^0 = 2047$. Each hexadecimal digit is represented by four bits. In the minimum configuration of RAM, only the first 512 bytes (address $\phi$1FF) are used.

The memory ROM is divided into sections each (except the first) having a capacity of 4096 bytes. The first section is comprised between the addresses $\phi 4\phi\phi$ (configuration of RAM equal to 1K byte) or $\phi 8\phi\phi$ (configuration of RAM equal to 2K bytes) and $\phi$FFF. The second section is comprised between the addresses $1\phi\phi\phi$ and 1FFF, and similarly for the other sections.

The first and second sections are always present and constitute the ROM for configuration 1 of the machine, the other sections are present only if required by the configurations associated with them, that is configurations (2), (3), (4) and (5).

Figure 3:
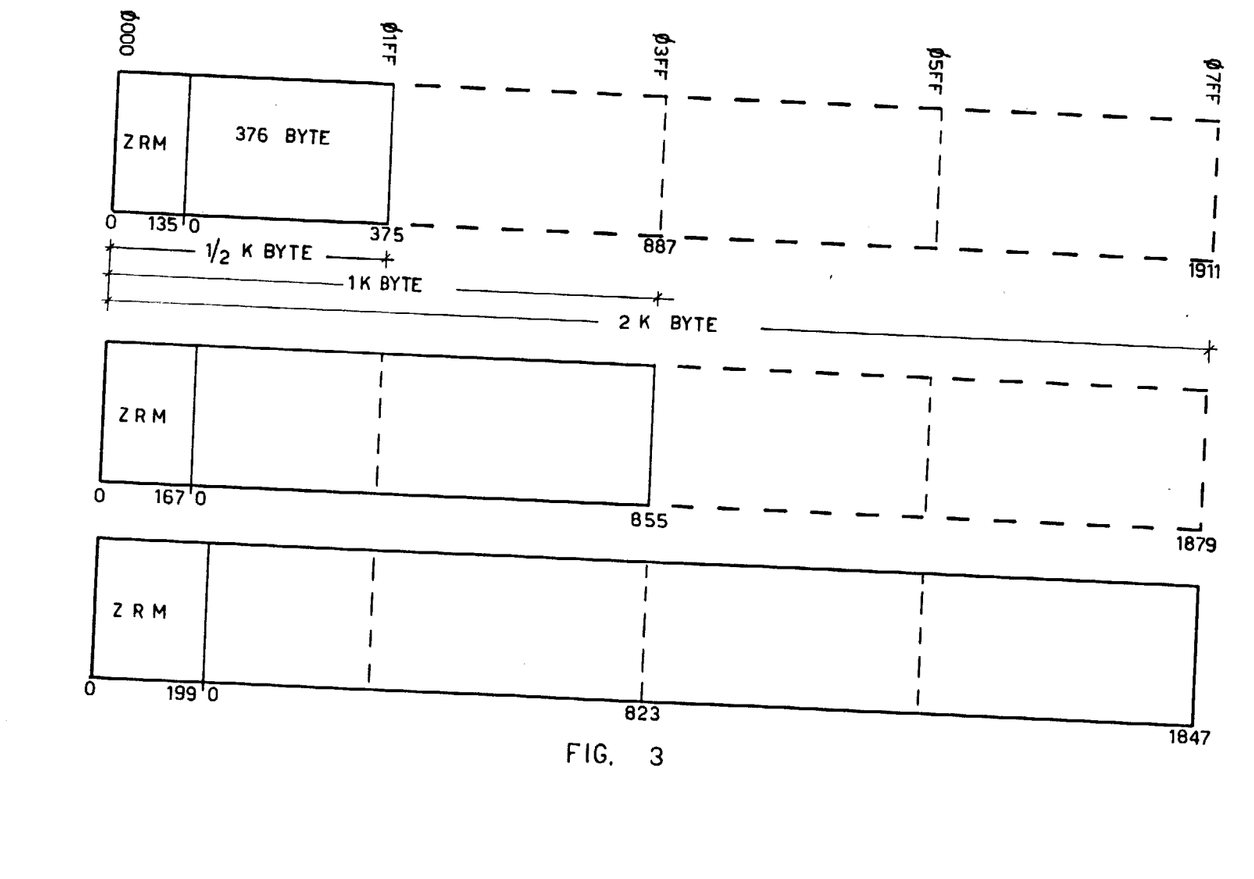
FIG. 3 is a diagram of the memory RAM.

Referring to FIG. 3, this shows the various sizes of the reserved zone ZRM and the consequent sizes of the memory available for the user. In the embodiment described, reference is made to three different sizes of the ZRM by means of which it is possible to handle the configurations hereinbefore described.

For each size of the ZRM there are indicated in the upper part of the diagram the RAM addresses in hexadecimal and in the lower part the available bytes of the RAM.

With the RAM configuration of ½K byte, the memory available is 376 bytes for a ZRM of 136 bytes, 345 bytes for a ZRM of 167 bytes, and 312 bytes for a ZRM of 200 bytes.

It will be noted, therefore, that if the ZRM were dimensioned for the maximum configuration (ZRM=200 bytes), the memory available would be only 312 bytes, even if the accounting machine was in the minimum configuration (configuration 1). Certainly, this available memory would not be sufficient for handling the user programs of the minimum configuration. It will also be understood from FIG. 3 that by dimensioning the ZRM automatically as a function of the machine configuration an increase of 64 bytes is obtained for the memory available by changing from the maximum to the minimum size of the ZRM, that is a percentage increase of nearly 15% is obtained if referred to a memory RAM of ½K byte.

It will moreover be noted from FIG. 3 that for a RAM of 1K byte the memory available is 823, 855 or 887 bytes according to the configuration of the ZRM, and that for a RAM of 2K bytes it is 1847, 1879 and 1911 bytes, respectively.

As has been said, it is possible to have three sizes of RAM of ½K, 1K and 2K, respectively. The accounting machine embodying the invention also automatically defines the size of the RAM, as will be explained hereinafter.

Figure 4:
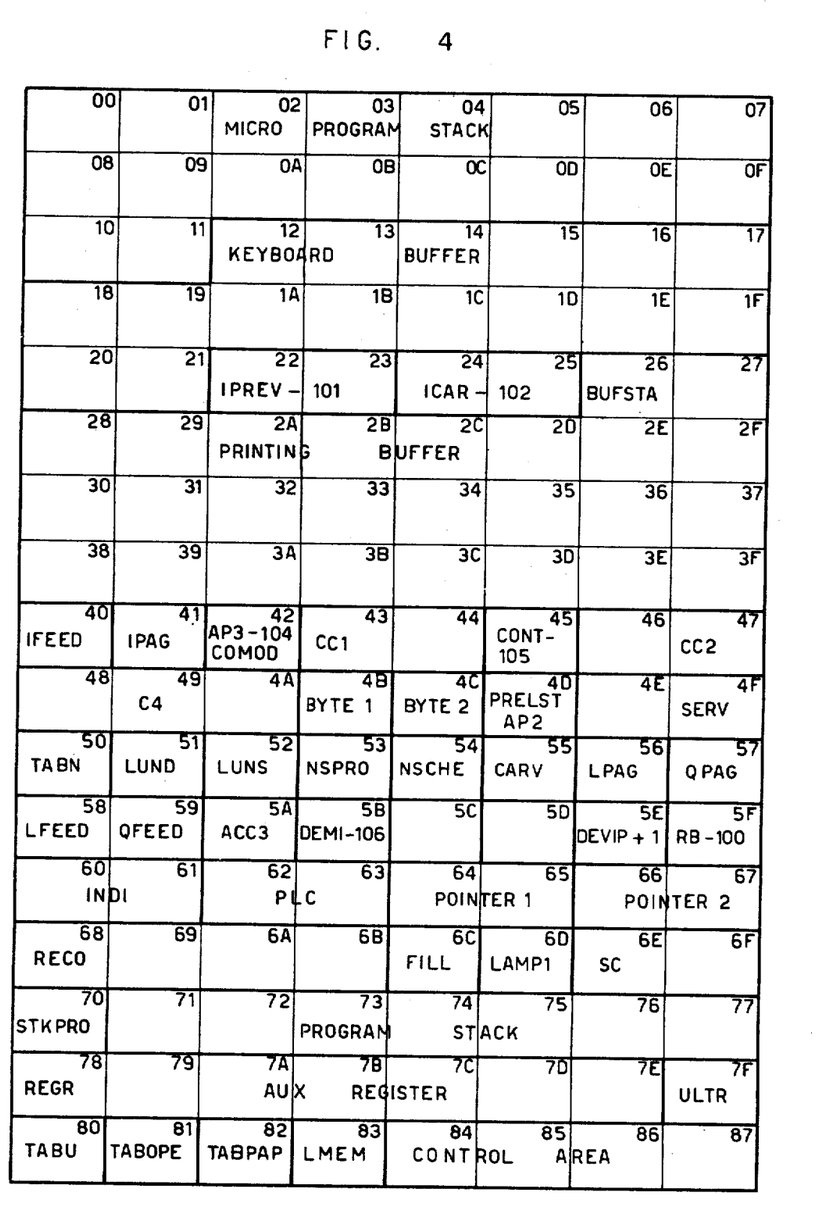
FIG. 4 is a diagram of the reserved zone ZRM.

For a better understanding of the function of the reserved zone ZRM, a detailed description of the ZRM, indicating the registers of which it is composed, when of capacity 136 bytes, will now be given with reference to FIG. 4. Each register is identified by a label and by the last two digits of its hexadecimal address. The registers of the ZRM are used by the microprograms for executing the instructions, as storage for parameters and data, or they are used by microprograms handling peripherals. These registers are solely at the disposal of the microprograms and are not accessible to the programer, since all the absolute addresses of the RAM are calculated from the end address of the ZRM, which is recorded in the base register RB-100. FIG. 4 shows the minimum ZRM, which terminates at the address $\phi\phi 87$ and therefore contains 136 bytes. The manner in which the registers of the ZRM are used will be better explained hereinafter.

The functions of the registers of the ZRM will now be described:

| | |
|---|---|
| register STACK $\phi\phi\phi\phi$ | stores the addresses of re-entry into the main microprogram. The first two characters ($\phi$, 1) are used by the pointer |
| register BUFTAS $\phi\phi 12$ | storage field for digital characters input from keyboard |
| register IPREV $\phi\phi 22$ | extraction address of characters of keyboard buffer |

-continued

| | |
|---|---|
| register ICAR ɸɸ24 | storage address of characters in keyboard buffer |
| register BUFSTA ɸɸ26 | storage field of characters to be printed; the end of the field to be printed is defined by the end separator FF, the extraction index is PRELST |
| register QFEED ɸɸ59 | almost end of form page |
| register IFEED ɸɸ4ɸ | form index |
| register BARRE ɸɸ5D | indicates by means of its bytes which bars are enabled |
| register COMOD (AP3) ɸɸ42 | accommodation area level 3 |
| register CC1 ɸɸ43 | computed address of first-operand register |
| register CONT ɸɸ45 | counter |
| register CC2 ɸɸ46 | computed address of second-operand register |
| register C4 ɸɸ48 | may contain one of the two addresses of C1 and C2 |
| register BYTE1 ɸɸ4B | function code of instruction to be executed in machine language |
| register BYTE2 ɸɸ4C | operands of instruction to be executed |
| register PRELST (AP2) ɸɸ4D | level 2 command area; contains the extraction address of the characters of the printing buffer |
| register SERV ɸɸ4F | service character (printing in red, black, etc.) |
| register NSPRO ɸɸ53 | number of sprocket line-spacings |
| register LUND ɸɸ51 | number of line-spacings on right |
| register LUNS ɸɸ52 | number of line-spacings on left |
| register TABN ɸɸ5ɸ | new tabulation address |
| register NSCHE ɸɸ54 | number of forms |
| register CARV ɸɸ55 | old character |
| register LFEED ɸɸ58 | length of paper feed |
| register QPAG ɸɸ57 | almost end of page |
| register LPAG ɸɸ56 | length of page |
| register IPAG ɸɸ41 | page index |
| register ACC 3 ɸɸ5A | preserves level 3 accumulator |
| register DEMI ɸɸ5B | switching element |
| register DEVIP ɸɸ5E | switching element |
| register RB ɸɸ5F | base register beginning of available memory |
| register POINT1) ɸɸ64 POINT2) ɸɸ66 | pointers used LIMO level |
| register INDI ɸɸ6ɸ | address of beginning of program |
| register RECO ɸɸ68 | condition register |
| register PLC ɸɸ62 | program counter |
| register FILL ɸɸ6C | filling character |
| register LAMP1 ɸɸ6D | state of lamps |
| register SC ɸɸ6E | service counter |
| register STKPRO ɸɸ79 | stores the addresses of re-entry into the main program |
| register REGR ɸɸ79 | contains, for example, the remainder of the divisions |
| register ULTR ɸɸ7F | last location of register RA |

Figure 5:
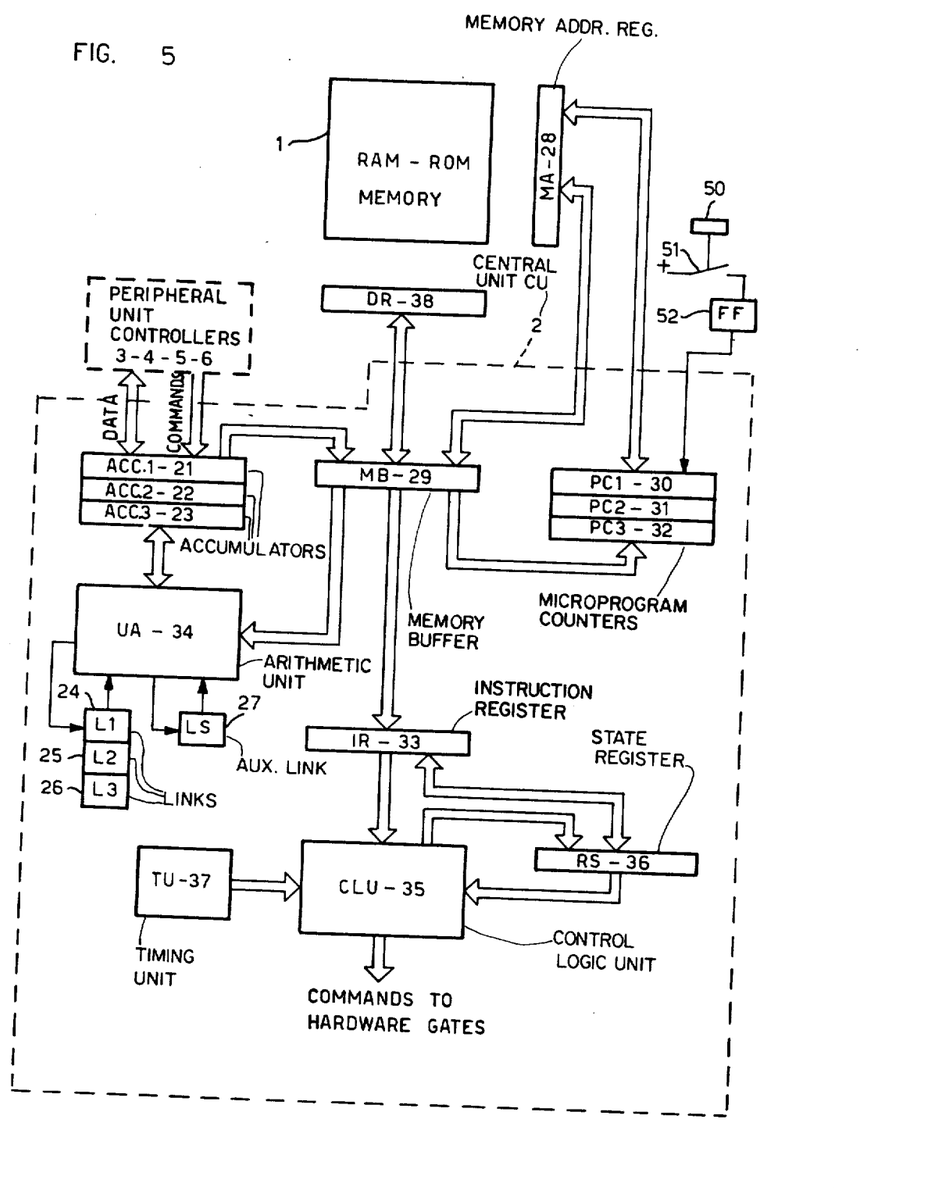
FIG. 5 is a block diagram of the central unit.

The block diagram of the CU 2 will now be described with reference to FIG. 5. The function performed by each element and the possible connections with other elements will be described. A detailed description will not be given, since these elements are known in the data processing field.

The central unit CU 2 has three operative levels obtained by triplication of the accumulator register, the program counter and the main link. During the operation of the CU 2, only the accumulator, the program counter and the link of the active level are enabled. The remaining accumulators, program counters and links are inhibited and contain the data relating to microprograms interrupted at the respective levels.

Passage from one operative level to another is controlled by special microinstructions and, due to the triplication of the registers, takes place without carrying out any preservation of parameters of the interrupted microprogram.

The CU 2 comprises:
Accumulator ACC

This is concerned with the memory buffer register MB in all the logical and arithmetic operations and is also the register containing the result of these operations.

A command from the control unit CLU-35, generated by the decoding of the instruction CLA (table C) enables the contents of the acculator ACC to be put back to zero. The content of the accumulator ACC is complemented by the command signals generated by the CLU-35 during the decoding of the instruction CMA (table C); the content of the accumulator ACC may equally be shifted circularly both to right and to left, respectively, by the decoding of the instructions LRR and LRL (table C). The ACC also serves as an I/O register; all the transfers of information between the memory and any peripheral unit pass through the accumulator.

There are three accumulators, one for each operative level, and they will be referred to as ACC1-21; ACC2-22; ACC3-23.

Memory buffer register MB-29

This is an 8-bit register which generally contains the byte read from memory as operand. It is an auxiliary operative register and for this reason it is directly interfaced with the arithmetic unit. There is one register MB-29 only.

Arithmetic unit UA-34

This is the arithmetic and logic unit and performs all the operations between the register MB and the accumulator. The result of these operations is stored in the accumulator and a possible carry is stored in the links, described below.

Thus, for example, in order to obtain a shift of the contents of ACC, it is necessary to transfer ACC to the unit UA and return the data, now shifted by one, to the accumulator.

The operations performed by the unit UA and the internal or external exchange of data are controlled by the control unit CLU by the decoding of the instructions shown in tables C and D.

Main link L

This one-bit register is used for extending the arithmetical possibilities of the accumulator. It is interfaced with the arithmetic unit UA and contains the carry after the eighth bit following an arithmetic operation.

The overflow of ACC into L may be verified by microprogram to simplify operations; the link may be restored to zero or complemented and its contents may be shifted circularly both to right and to left simultaneously with the contents of ACC. There are three main links, one for each level, and these are L1-24; L2-25; L3-26.

Auxiliary link LS-27

This is interfaced with the arithmetic unit and stores a possible carry after the fourth bit when an arithmetic operation is carried out between ACC and the memory buffer MB-29. There is a single auxiliary link and it must be transferred to the main link of the level on which operation is being carried out to be able to execute the same operations which can be performed on the same main link.

Program counter PC

This is a 16-bit register containing the address of the next instruction to be executed, which determines the order in which the various instructions must be executed.

The contents of PC are transferred to a memory addressing register MA-28 to determine the address from which each microinstruction is extracted. The incrementing of PC defines successive areas of the microprogram and enables an instruction to be skipped owing to verification of information or on particular conditions. There are three microprogram counters, one for each level, and these are PC1-30; PC2-31 and PC3-32.

Memory address register MA-28

This is a 16-bit register which contains the address of the memory location containing the operand. This register can address the whole of the memory directly.

Instruction register IR-33

This 8-bit register contains the instruction loaded from memory and arranged for execution. The contents of IR are decoded to produce and influence the various machine cycles. There is one instruction register only.

Control unit CLU-35

In order to carry out a microinstruction, several machine cycles are executed under the control of the CLU-35 and of a register RS-36.

The control unit CLU, in fact, is the logic unit which controls and co-ordinates the operative steps of the central unit in accordance with the instructions stored from time to time in the instruction register (IR). Particularly, the CLU-35 includes a decoding network adapted to decode each microinstruction received from register IR-33. This network selectively activates a plurality of output conductors labeled as "COMMANDS TO HARDWARE GATES" in FIG. 5, each one corresponding to the code of an associated microinstruction. The conductors are connected to the CLU-35 which supplies for each microinstruction a series of associated commands in a predetermined time relationship, as hereinafter mentioned, to control the data within the central unit and to actuate gate circuits permitting the transfer of information from one register to another of the memory 1.

An instruction is read in memory at the address indicated by the register PC; the function code of the instruction is transferred to the register IR and the register PC is incremented by 1.

When the bit 2 of an instruction has the value 1, a number of machine cycles are introduced to obtain the effective address of the operand contained at the address designated in the instruction. This action is called indirect addressing because access to the operand takes place by means of the addressing of a memory location, of the zero page or the current page, containing the true address of the operand. A more detailed description of the CLU-35 can be found in U.S. Pat. No. 3,940,746 filed on Aug. 5, 1974 and assigned to the same assignee as this application. In particular the description of the CLU-35 is disclosed in column 12, line 58 to column 18, line 14. The structure of the three hardware levels of operation realized by means of the accumulator registers ACC1-ACC3 and with the corresponding program counter registers PC1-PC3, are described in the U.S. Pat. No. 3,940,745, filed on Apr. 26, 1974, and assigned to the same assignee of this application. In particular, from column 2, line 62 to column 8, line 23, is described the instructions JSL corresponding to the instruction LEVND of table C. The internal structures of CLU-35 are also described in chapter 2 (see, for example, in particular FIGS. 2.16–2.18 and corresponding descriptions) of the book "Microprogramming, Principles and Practice" to Samir S. Husson, copyrighted in 1970 by Prentice-Hall, Inc., Englewood Cliffs, N.J. (Library of Congress catalog card Number 72-122612).

Timer TU-37

The timer TU-37 is of the type described in the above cited U.S. Pat. No. 3,940,746 column 9 lines 35 and following. The signals generated by the timer TU-37 are described in the following in connection with the state register RS-36. The signals are selected by the CLU-35 on the basis of the microinstruction stored in the instruction register IR-33 as described in detail in the above book to Husson (see FIGS. 2.2 and 2.3).

State register RS-36

This register is loaded from the register IR-33 and, on the basis of the microinstruction code, supplies to the CLU-35 the sequence of states relating to the particular microinstruction.

Figure 6:
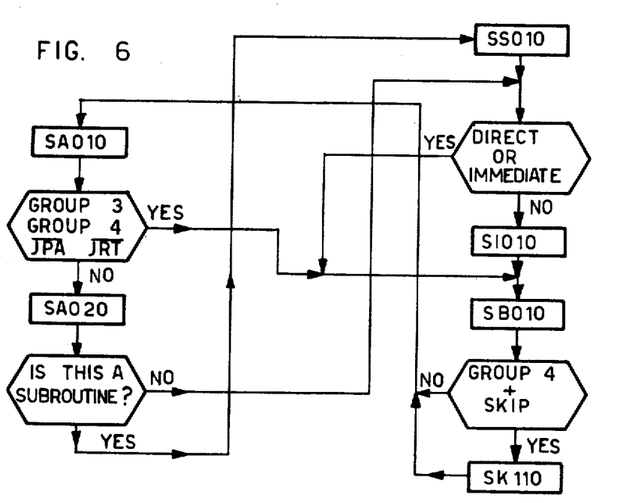
FIG. 6 is a flow diagram of the states of execution of the microinstructions.
Figure 7A:
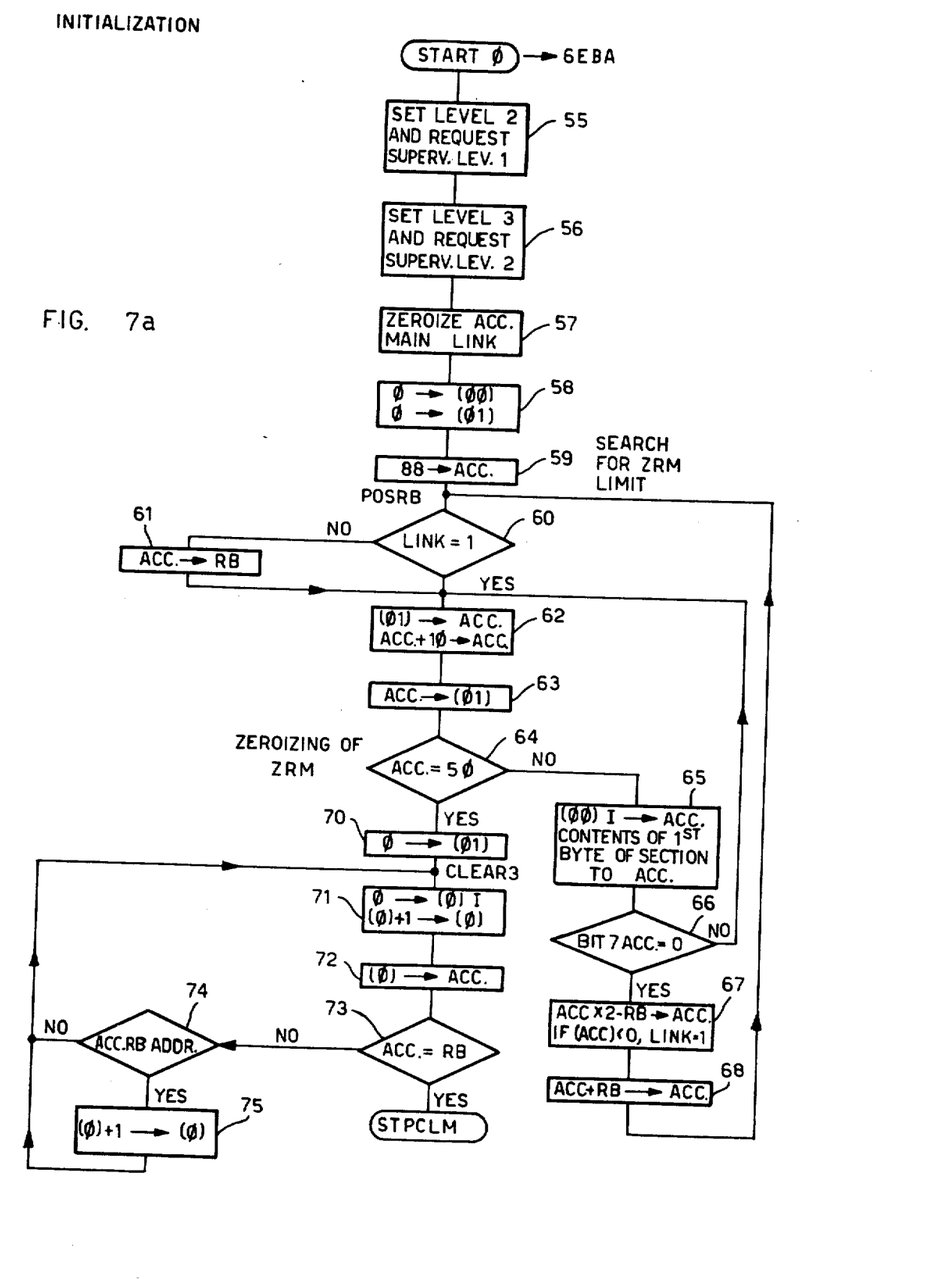
FIG. 7a is a flow diagram relating to the initializing device for the calculation of the capacity of the reserved zone of the RAM.
Figure 7B:
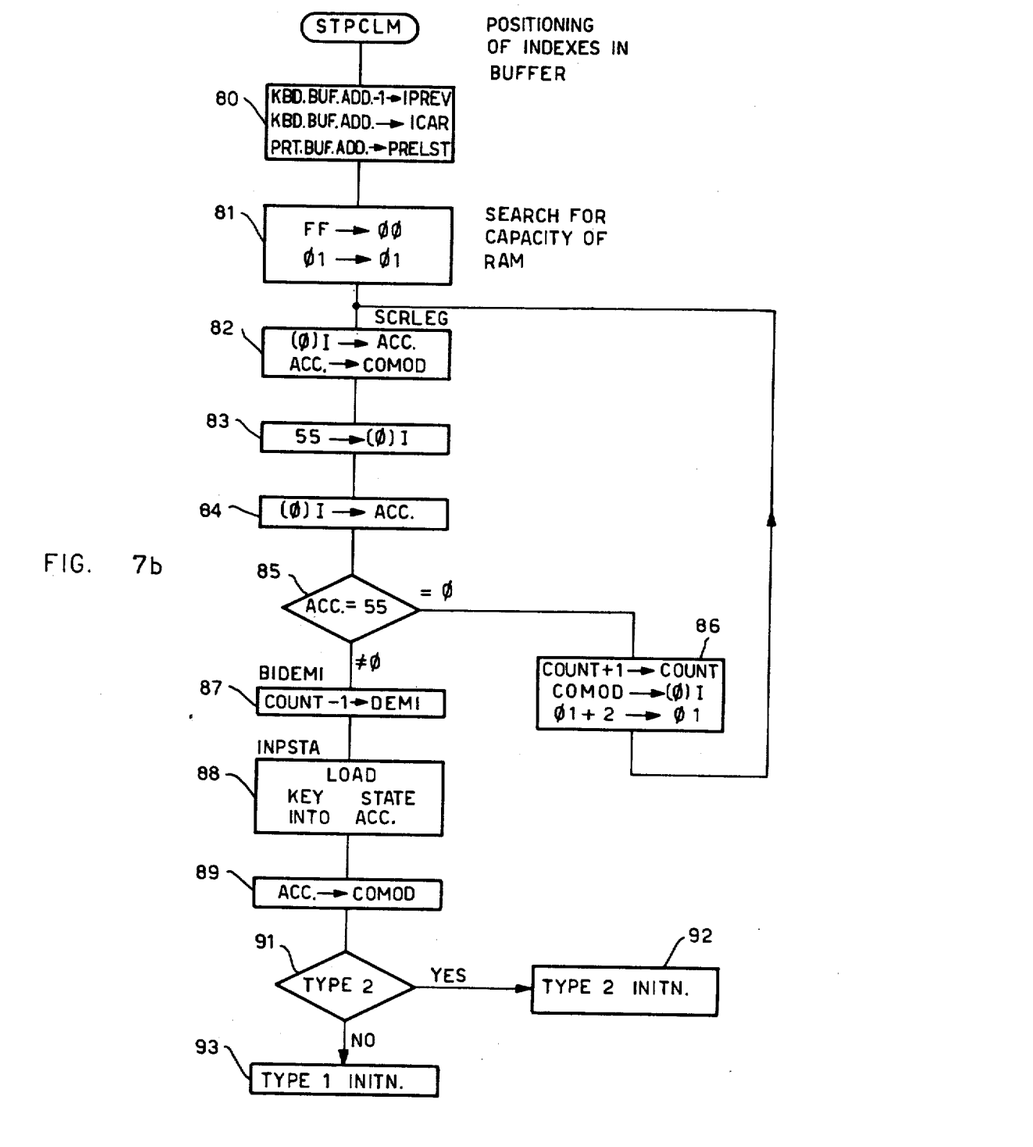
FIG. 7b is a flow diagram for the calculation of the capacity of the memory RAM.

FIG. 6 is a flow diagram illustrating the operation of the control unit CLU-35 for calculating the sequence of states for each microinstruction. More particularly, the state SA010 is the state of storage of the first byte of the microinstruction. The state SA020 is the state of storage of the second byte of the microinstruction. The state SS010 is the state of storage of the address of re-entry from a subroutine. The state SI010 is the state of storage of the indirect address. The state SB010 is the state of execution of the microinstruction. The state SK110 is the state in which the two bytes of the microinstruction following the one in progress are skipped.

A list of the microinstructions which can be executed by the CU 2 and of the operations effected by them will now be given. The method of execution of the individual microinstructions will not be described in detail, but it is briefly stated that each microinstruction is executed in accordance with the sequence of states of FIG. 6 and that the operations are carried out by means of the generation of a timed series of commands by the control unit CLU-35 on the basis of the active state at that time and of the microinstruction code. The manner in which the control unit CLU-35 generates the commands on the basis of the state and of the microinstruction being executed can be easily deduced from the book "Microprogramming, Principles and Practice" by Samir & Husson, Chapters 1 and 2, published by Prentice-Hall Inc., Englewood Cliffs, N.J.

The microinstructions are divided into four groups.

The microinstructions of the 1st group are composed of sixteen bits and have the following format:

| First byte | |
|---|---|
| Bits 7 and 6 = 11 | (Group designation) |
| Bits 5-2 | Function code |
| Bit 1 = 1 | for indirect addressing |
| = 0 | for direct addressing |
| Bit 0 = 1 | for current page |
| = 0 | for zero page |
| Second byte = Address | |

These instructions are summarized in Table A.

The microinstructions of the 2nd group are composed of sixteen bits and have the following format:

| First byte | |
|---|---|
| Bits 7 and 6 = 10 | (Group designation) |
| Bits 5-2 | Function code |
| Second byte | Constant |

These instructions are summarized in Table B.

The microinstructions of the 3rd group are formed by eight bits and have the following format:

| Bits 7 and 6 = 00 | (Group designation) |
|---|---|
| Bits 5-0 | Function code |

These instructions are summarized in Table C.

The microinstructions of the 4th group are composed of eight bits and have the following format:

| Bits 7 and 6 = 01 | (Group designation) |
|---|---|
| Bit 5 = 1 | Input |
| = $\phi$ | Output |
| Bit 4 = 1 | Flag L1 and if L1 = 1, skip 2 bytes |
| = $\phi$ | — |
| Bit 3 | { selection output |
| | name input |
| Bit 2 | { command output |
| | state input |
| Bit 1 | Spare |
| Bit $\phi$ | Reset |

These instructions are summarized in Table D.

INITIALIZATION OF THE ACCOUNTING MACHINE

The initialization operation of the accounting machine will now be described with reference to FIGS. 4, 5, 7a, 7b and 8 and Tables A, B, C, D and E. Table E shows in the first column the list of instructions or routines indicated by their symbolic names which are used in the initialization microprogram and in the second column the ROM address of the relevant microinstruction the microinstructions and operands of which are listed in the third and fourth columns, respectively. The meaning of each microinstruction is found in the tables from A to D. On the switching-on of the machine, the operator actuates a key 50 (FIG. 5) to close a microswitch 51 which, in turn, sets a flip-flop 52. This is connected in such manner as to force into the register PC1-30 (microgram counter of level 1) the address "01101110110011$\phi\phi$0" (6EBA in hexadecimal), which is the initial address STARTO of the initialization microprogram (Table E and FIGS. 7a and 7b). At this address there is recorded a microinstruction CDN (Table A) which inhibits the addresser PC1-30 and enables the microprogram addresser PC2-31 to jump to a routine of level 2. The microinstruction JMPIM (Table B) is then executed and positions the register PC1-30 at the address of the supervisory program of level 1 (block 55). Other microinstructions CON and JMPIN cause the same operands to be executed for level 2 (block 56), so that the machine passes to level 3. A microinstruction OPAL, not listed in Tables A to D, is then executed to provide for the zeroizing of the accumulator ACC3-23 and of the link L3-26 (block 57).

Now the routine for searching the limit of the ZRM (FIG. 4) of memory is executed. This routine includes two microinstructions CLM, which provide to zeroize the cells (registers) $\phi\phi$ and $\phi 1$ of ZRM (block 58). Then a microinstruction LACIM (Table B) causes the unit CLU-35 to force into the accumulator ACC3-23 (block 59) the hexadecimal code "88". The link L3-26 is then examined upon execution of a microinstruction SNL (Table C, logical decision 60). Since it is at level 0, a microinstruction DAC (Table A) causes the central unit 2 to transfer and record the said code "88" to the base register RB-100, by means of record means known per se and included in the central unit 2. In this way there is defined the minimum limit of the ZRM, which is 136 bytes, and the end address of which is precisely "$\phi\phi$87" (block 61).

Now a microinstruction LAC (Table A) causes the unit CLU 35 (FIG. 5) to transfer the contents of the cell "$\phi 1$" which in this case are equal to "$\phi\phi$" to ACC3-23 and is followed by a microinstruction ADDIM (Table B), which causes the arithmetic unit UA-34 to add "1$\phi$" to the contents of ACC3-23 and to transfer the sum again to ACC3-23 (block 62). In this case, the number "1$\phi$" is recorded in ACC3-23.

This number is thereafter transferred to the first cell "$\phi 1$" of the ZRM under the control of a microinstruction DAC (block 63). The number "1$\phi\phi\phi$" represents the address of the first cell C2 of the section 2 of the ROM. The first cell of ZRM thus represents a register of the RAM for storing a memory address. Under the control of a microinstruction CPAIM (Table B), the contents of ACC3-23 (in this case "1$\phi$") are then compared with the constant "5$\phi$" which represents the address of the cell C6 of the last memory section (logical decision, 64). Since the contents of ACC3-23 are different from "5$\phi$", a microinstruction LAC of the Table A causes the control unit CLU-35 to transfer the contents of the cell addressed by the address obtained by reading the cells "$\phi\phi$" and "$\phi 1$" of the ZRM to ACC3-23. Since the contents of the two cells are "1$\phi\phi\phi$", the LAC microinstruction causes a reading means, including the data register 38 (FIG. 5), the memory buffer MB 29 and the accumulators ACC 1-21, ACC 2-22 and ACC 3-23, to read the first cell C2 of the second section (FIG. 2 and block 65), whereby the reading means represents an identifying means for the ROM section.

In this cell there is recorded the end address divided by two of the ZRM required for handling the microprograms recorded in the second section. Although, as mentioned above, the second section is always present, if it were to be absent because the options handled by its microprograms were not required in the current configuration of the machine, there would not be any information recorded in the first cell of the second section, that is the contents of this cell would appear to be 'FF' (that is, all the eight bits at logical 1 level). The absence of information in the cells of the ROM is always indicated with the bits at level 1. Thus, whenever an attempt is made to read a cell which is not there, the answer is always 'FF'. Therefore the various sections of the ROM can be mounted in the machine according to the configuration given by the connected peripheral units, since absence of the cells C2–C6 of the section is read by the central unit as not recorded cells.

If, on the other hand, the second section of microprograms is present (as is actually always the case), in the cell C2 there is recorded a number which is equal at the most to 100 in decimal and is actually 68 in hexadecimal in the case of cell C2. In fact, it has been seen (FIG. 3) that the ZRM can attain a size of 200 bytes at the most. Since the decimal number 100 in eight-bit binary code (two-digit hexadecimal) is written '01100100', the bit 7 of the cell C2 and of the cells C3 to C6 is at level 0, whatever the numbers therein.

Since the contents of the cell C2 have been transferred to the accumulator, to recognize whether the second section is present it is sufficient to examine the bit 7 of ACC3-23 (logical decision 66). The bit 7 is examined under the control of the unit CLU-35 upon executing the microinstruction SPA (Table C). If the second section were not present (bit 7=1), a return would be made to the block 62, starting from which the blocks 63, 64, 65, 66 are re-executed, by means of which the bits of the cells C3, C4, C5 and C6 of the other sections are examined, whereby the memory sections are sequentially identified.

The second section will always be detected as present. The aforementioned cycle is then repeated four times to detect the possible presence of a further section or sections, for example the third section, is detected. If, on the other hand, after the reading of the cell C6, the presence of no further section after the second section has been detected (logical decision 64), the machine goes on to proceed with other operations which will be described hereinafter and the ZRM remains defined at the value of 136 bytes.

If the third section is present (bit 7 of C3=0), the machine jumps to execute the microinstruction RAC (Table C) which causes the unit UA-34 to subtract the contents of the base register RB-100 from the product. After this subtraction, two possibilities can occur: that the result is greater than, or equal to, zero or that it is less than zero. In the first case, the link L3-26 is put to zero, in the second case it is put it to 1. It is thus clear that the link L3-26 is adapted to receive the results of comparison means included in the unit UA-34.

In the example given, let it be assumed that the microprograms of the third section require a ZRM of 168 bytes, so that the position will be that the result of the subtraction is greater than zero; in this case, the link L3-26 will remain at level 0.

After these operations, the microinstruction ADD causes the contents of the cell C3 (doubled) to be reconstructed in the accumulator ACC3-23 (block 68). The JUMP instruction causes a return to the address POSRB (logical decision 60). Since the link L3-26 is still at level 0, the contents of the accumulator ACC3-23, which represent the new limit of the ZRM ($\phi\phi$A7 in the example given), are loaded into the base register RB-100. Of course, this value is substituted for that previously recorded (hexadecimal 88). The operations which have just been described are then repeated with the reading of the cell C4 (fourth section). If the limit of the ZRM concerning this section is greater than, or equal to, the value A7 previously recorded in RB-100, this value is substituted for the preceding one; if, on the other hand, it is less than the preceding value, the link L3-26 at level 1 will be obtained as output at the block 67, so that when the logical decision 60 is reached the block 60 is not executed. Consequently, the value previously recorded remains recorded in RB-100.

The operations which have just been described are repeated as far as the reading of the cell C6, that is until such time as the contents of ACC3-23 at the logical decision 64 are equal to 5$\phi$.

From what has been said it will be clear how it is possible to proportion the ZRM to the maximum value required by the sections of microprograms recorded in the ROM.

The limit value of the ZRM is recorded in the base register RB-100, to which reference will be made by all the instructions for calculating the absolute addresses of the operands. Particularly, the CU 2 includes means (known per se) which are responsive to the content of the register RB-100 for defining the ZRM and causing it to be reserved to the central unit CU 2. In this way, the ZRM is not user program accessible.

After defining the limit of the ZRM, the machine passes to block 70 in which the cell $\phi$1 is zeroized. Then, the cell addressed by the address contained in the cell $\phi$, which is the cell $\phi$ itself, is zeroized and the contents of the cell $\phi$ are incremented (block 71). The incremented address is then transferred to ACC3-23 (block 72) and this address is compared with the one recorded in RB-100 (logical decision 73). As long as this address does not coincide with the address in the base register (logical decision 74), the corresponding cell is zeroized. In this way, the whole of the ZRM is zeroized, except the base register RB-100. In fact, in correspondence with its address, the contents of the cell $\phi$ are incremented (block 75), so that the base register RB-100 is skipped before reaching the block 71.

When the reserved zone ZRM is completely zeroized (apart from RB-100), that is when ACC=RB (logical decision 73), the machine passes to the ROM address STPCLM.

From this address the initial address of the keyboard buffer register less 1 is transferred to the byte IPREV-101 and the address of this buffer is transferred to the byte ICAR-102 (block 80). The registers ICAR and IPREV are used as loading and extraction indexes for the keyboard buffer.

After this, the machine passes to defining the memory RAM present in the current configuration of the accounting machine. To do this, in the cells $\phi\phi$ and $\phi 1$ of the ZRM there is compiled the hexadecimal address $\phi 1$FF (block 81), which corresponds to the address of the 512th cell B05 of RAM (first $\frac{1}{2}$K of RAM). The cells $\phi\phi$ and $\phi 1$ of the ZRM will store all the addresses needed for addressing the other modules of RAM and constitute thereby an addressing register included in the addressing means. These operations are performed at the address 6F02, in Table E. The instruction STA (Table B) provides to zeroize ACC3-23 and to complement it, whereby the number FF is created; this is transferred into the cell $\phi\phi$ of the ZRM by means of the instruction DAC. In a similar way the instruction ONE (Table C) creates the number $1\phi$ in ACC3-23, and another DAC instruction transfers it to the cell $\phi 1$ of the ZRM. The contents of the memory addressed by the cells $\phi\phi$ and $\phi 1$, that is the contents of the cell B1, are then recorded in ACC3-23 by means of an instruction LACI (already explained); these contents are reserved in the cell COMOD-104 (block 82). Then a LACIM and DACI instructions cause the hexadecimal character "55" which is written in binary as 01010101 (block 83) to be stored at the address contained in the cells $\phi\phi$ and $\phi 1$ (that is, $\phi 1$FF). Then there is carried out the reading of the contents of this cell B1 by means of a LACI instruction, still using the address $\phi 1$FF, and these contents are transferred to ACC3-23 (block 84).

It must be made clear that in the absence of two first 512 bytes of RAM the reading at the address $\phi 1$FF (cell B05 non-existent) would be F1 that is eight bits at level 1; if, on the other hand, the RAM is present, the contents of this cell would be "55". A check is therefore made (logical decision 85) by means of the SUBIM instruction (Table B) which leaves selectively the number "$\phi\phi$" or a different number in ACC3-23. Only in the first case the first $\frac{1}{2}$K byte of RAM is present, otherwise it is absent. Of course, the first $\frac{1}{2}$K byte of RAM is always present, since the accounting machine provides $\frac{1}{2}$K byte of RAM in the minimum configuration.

When present, an INC instruction (Table A) is provided to increment a register CONT-105 belonging to the ZRM (block 86). The register CONT-105 represents the third register included in the further recording means. It is incremented each time a module of RAM is present, whereby at the end of recognition it stores the number of modules present.

The machine therefore executes the operations shown by means of which the contents of the byte CONT-105 are incremented by one unit of the contents previously reserved in the byte COMOD-104 are restored to the cell B1. The contents of the cell $\phi 1$ are then incremented by two subsequent INC instructions (Table A); this content is now being $\phi 3$ (block 86). A return is then made to the block 82 (address SCRLEG of ROM) by means of a JUMPIM instruction (Table B) and the same operations described for the blocks 83, 84, 85, 86 are repeated, that is, there is reserved in the byte COMOD-104 the contents of the cell B2 at the address $\phi 3$FF (last cell of the second $\frac{1}{2}$K byte of RAM), hexadecimal '55' is written in this cell, reading of the cell B2 is carried out and a check is made whether the contents are equal to '55'. If this result is obtained, this means that the second $\frac{1}{2}$K byte is also present, the contents of CONT-105 are then incremented and the contents preserved previously in COMOD-104 are restored to $\phi 3$FF. If, however, the cell B2 is non-existent, the code '55' which the machine attempts to write into this cell will not be read out so that it is known that the cell B2, and thus the second $\frac{1}{2}$K byte, are absent. The cycle which has just been described is repeated reading the cells B3, B4 until such time as it is detected that the character written in the last cell of the last $\frac{1}{2}$K byte examined is no longer equal to the character read therein (logical decision 85). This means that the last $\frac{1}{2}$K byte examined does not exist. Under these conditions, the machine passes to the address BIDEMI (block 87).

Since the size of the RAM jumps from 1K byte to 2K byte, the tests on cells B3 and B4 will either both yield the answer B3 and B4 absent or both yield the answer B3 and B4 present. If the RAM is 1K byte and the ROM occupies the second, as well as the third and fourth $\frac{1}{2}$K bytes of the first section, the tests on cells B3 and B4 will still indicate these cells to be absent. Since they are ROM cells, the code '55' will not be written therein and the reading of B3 and B4 will yield answers differing from '55'.

It is to be noted that the number + one of $\frac{1}{2}$K bytes of RAM present is recorded in the register CONT-105. For example, if 2K bytes of RAM are present, this number will be 5, and so on. After the operations which have just been described, the contents of the register CONT-105 reduced by one unit are recorded in the cell DEMI-106, which therefore contains the number of $\frac{1}{2}$K bytes of RAM present.

This number will be checked by all the instructions of the current program which use the RAM in order to signal possible memory overflows.

From what has been said it will therefore be clear how it is possible to define automatically both the ZRM and the memory RAM present, whatever the configuration of the accounting machine.

After defining both the ZRM and the RAM present, operation goes on to defining the type of carrier from which the user program is to be loaded. To do this, the position of a push button of the console 13 is examined. In fact, the user programs can be loaded into the RAM either from the magnetic card unit 12 or from the magnetic tape reader 17 or from the remote computer 20.

Normally, the programs are loaded from the magnetic card by procedures which are not described in detail. It is desired now to make clear the mechanism by means of which it is possible to load the user programs of different types of carrier or directly by the processor through the transmission line. This is particularly useful, for example, when it is desired to record data coming from the computer on to the magnetic tape during the hours when offices are closed for the purpose of updating records. To do this, before leaving the office, the operator positions or sets a suitable push button indicated in FIG. 8 by the label TIP2-110, which indicates that the working program of the accounting machine (for example, the program which provides for the loading of the data coming from line on magnetic tape) must be loaded into the RAM from the telegraph line. To establish the type of carrier, the state of the push button TIP2-110 is examined (logical decision 91).

This is done by the routine INPSTA executed by means of two microinstructions IOF (one of selection output and the other of state input) which provide for loading into ACC3-23 the state byte of the push buttons, the individual bits of which are each associated with a corresponding push button of the console 13. In this particular case, the push button TIP2-110 is associated with bit 7 of the channel 124.

Figure 8:
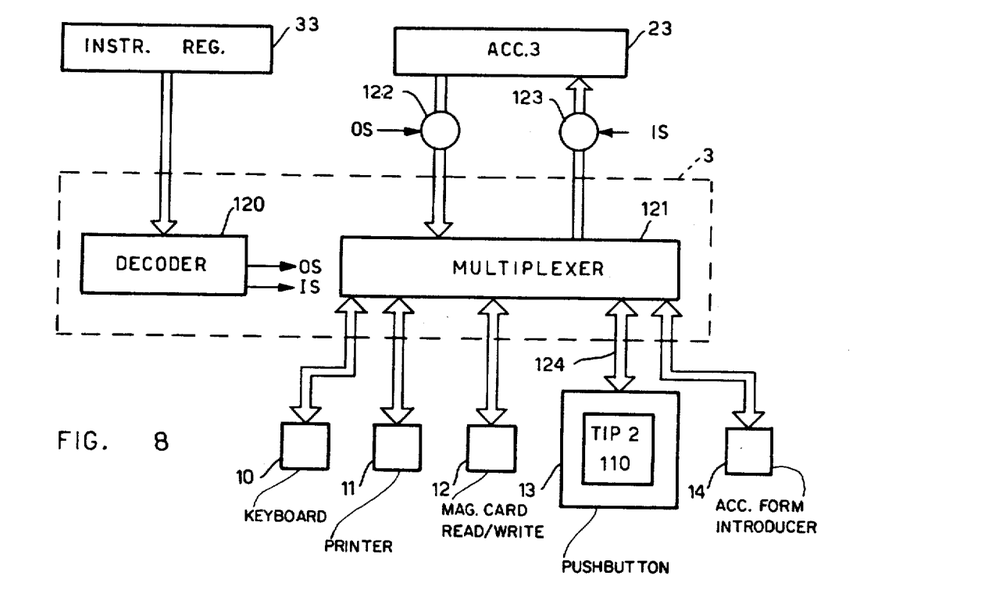
FIG. 8 is a block diagram of the controller for the peripheral units.

The manner in which the state of the push buttons is loaded into ACC3-23 will now be described with reference to FIG. 8 and in this respect there will be described only that part of the controller 3 which performs this operation.

The controller 3 comprises inter alia a decoder 120 which is directly connected to the microinstruction register IR-33 and recognizes the input/output microinstructions IOF. More particularly, when it recognizes a selection output microinstruction (see Table D) characterized by the code "01001000", it generates a signal OS which enables the transfer of the contents of ACC3-23 to the multiplexer 121 of the controller 3 through the channel 122. These contents provide for selecting one of the four channels handled by the multiplexer 121.

When, on the other hand, the decoder 120 recognizes a state input microinstruction (code "01100100"), it generates a signal IS which enables the transfer of the byte present on the channel 124 previously selected to the accumulator ACC3-23. In this way, the state of the push buttons is loaded into the accumulator.

The routine INPSTA uses the circuit which has just been described. By means of a selection output microinstruction IOF, it selects the channel identified by the code "E", that is the channel 124 connected to the push buttons 13, and by means of a state input microinstruction IOF it loads the byte present on the channel 124 into the accumulator (block 88); it then reserves this byte in the coil COMOD-104 of the ZRM (block 89). The bit 7 of ACC3-23 is then examined (logical decision 91), which bit, as has been said, is associated with the state of the push button TIP2-110. If this bit is at level 1, a so-called initialization of type 2 is executed (block 92), otherwise an initialization of type 1 is executed (block 93).

The initialization of type 1 could refer, for example, to the loading of the object program on a magnetic card, while the initialization of type 2 could refer to line loading. The microprograms relating to the two types of initialization are not described in detail, but brief mention will be made of the functions performed.

Both the initialization of type 1 and that of type 2 provide for defining a zone of the RAM into which the program is to be loaded and for enabling the controller associated with the peripherals from which it is necessary to extract the object program. In the case of the initialization of type 1, the controller 3 is enabled to transfer the instructions from the magnetic card reader 12; in the case of initialization of type 2, the line controller 6 is enabled.

When the program is loaded into the pre-defined zone of the RAM, the starting of this program is proceeded with by loading the address of the initial cell of this zone into the instruction register IR.

In addition to line loading, it will be obvious how it is possible to initialize the accounting machine and load the programs of different carriers solely by operating predetermined keys each associated with a particular carrier. In fact, actuation of the key TIP2 could enable the testing of a third key which is associated with the loading of the program from a third carrier. In fact, if this key is actuated, the machine passes to an initialization of type 3 which provides for loading the program from the carrier actuated at the third key.

TABLE A

| Function code | Format (bits) 765432 | Description of instruction |
|---|---|---|
| DAC | 110110 | Acc → Mem |
| LAC | 110101 | Mem → Acc |
| AND | 110011 | Logical AND between Mem and Acc → Acc |
| XOR | 110100 | Exclusive OR between Mem and Acc → Acc |
| ADD | 110010 | Binary addition between Mem and Acc → Acc   L1 = 1 if carry 8th bit   L2 = 1 if carry 4th bit |
| CPA | 110001 | Mem: Acc if ≠ 2 bytes are skipped |
| DEM | 111001 | Decrements Mem by 1 if = 255 a skip of 2 bytes is executed |
| JMP | 111010 | Unconditional jump |
| CAL | 111110 | Jump to subroutine |
| CDN | 111111 | Lowers the level (from n to n + 1) and jump to subroutine |
| SUB | 110000 | Binary subtraction Acc − Mem   L1 = 1 if borrow 8th bit   L2 = 1 if borrow 4th bit |
| INC | 111000 | Increments Mem by 1 if = φ a skip of 2 bytes is executed |
| CLM | 110111 | φ → Mem |

TABLE B

| Function code | Format (bits) 765432 | Description of instruction | |
|---|---|---|---|
| LACIM | 100101 | Constant → Acc | |
| ANDIM | 100011 | Logical AND between constant and Acc → Acc | |
| XORIM | 100100 | Exclusive OR between constant and Acc → Acc | |
| ADDIM | 100010 | Binary addition between constant and Acc → Acc | L1 = 1 if carry 8th bit   L2 unchanged |
| SUBIM | 100000 | Binary subtraction Acc − constant →Acc | L1 = 1 if borrow 8th bit   L2 unchanged |
| CPAIM | 100001 | Constant: Acc if ≠ a skip of 2 bytes is made | |
| JMPIM | 1010XX | Unconditional jump | 1: address as constant (8 least significant bits) 2: the 8 most significant bits are given by the 4 most significant bits of the instruction address and the 4 least signifi- |

TABLE B-continued

| Function code | Format (bits) 765432 | Description of instruction |
|---|---|---|
| CALIM | 1011XX | Unconditional jump to subroutine address cant bits of the first byte as JMPIM |

TABLE C

| Function code | Format (bits) 76543210 | Description of instruction | Hexadecimal code |
|---|---|---|---|
| SZA | 00010110 | Skip of two bytes if Acc = $\phi$ | 16 |
| SNA | 00010111 | Skip of two bytes if Acc $\neq \phi$ | 17 |
| SPA | 00011011 | Skip of two bytes if bit 7 of Acc = $\phi$ | 18 |
| SMA | 00011010 | Skip of two bytes if bit 7 of Acc $\neq$ 0 | 1A |
| SZL | 00011000 | Skip of two bytes if L1 = $\phi$ | 18 |
| SNL | 00011001 | Skip of two bytes if L1 = $\phi$ | 19 |
| LEX | 00010010 | Exchange of L1 with L2 and vice versa | 12 |
| APEX | 00000001 | Exchange of Acc with Pointer and vice versa | $\phi$1 |
| RET | 00000011 | Re-entry from subroutine | $\phi$3 |
| JAC | 000001XX | Unconditional jump to the address specified by Acc | $\phi$X |
| POINT | 00000000 | Pointer $\longrightarrow$ Acc | $\phi\phi$ |
| CLA | 00100001 | $\phi \longrightarrow$ Acc | 21 |
| CLL | 00100010 | $\phi \longrightarrow$ L1 | 22 |
| CMA | 00100100 | The accumulator (Acc) is complemented | 24 |
| CML | 00101000 | L1 is complemented | 28 |
| IAC | 00110000 | Acc is incremented by 1 | 3$\phi$ |
| NOP | 00010000 | No operation. The pointer is incremented by 1 | 1$\phi$ |
| ION | 000010XX | Enables CPU for interrupts, XX defines the level | $\phi$X |
| IOFF | 000011XX | Inhibits CPU for interrupts, XX defines the level | $\phi$X |
| STOP | 00010001 | Execution is interrupted-CPU in console state | 11 |
| LEVDN | 00010100 | From level n to n +1 if n =3 n unchanged | 14 |
| LEVUP | 00010101 | From level n to n −1 if n =1 n unchanged | 15 |
| LRR | 00011100 | Shift to right $\longrightarrow$ Acc $\longrightarrow$ Link 1 $\longrightarrow$ | 1C |
| LRL | 00011101 | Shift to left $\longleftarrow$ Acc $\longleftarrow$ Link 1 $\longleftarrow$ | 1D |
| RAR | 00011110 | Shift to right with overflow $\longrightarrow$ Acc | 1E |
| RAL | 00011111 | Shift to left with overflow $\longleftarrow$ Acc | 1F |
| SWOP | 00000010 | Exchange of the two half bytes of the Acc. L1 modified | $\phi$2 |
| STA | 00100101 | CLA + CMA | 25 |
| ONE | 00110001 | CLA + IAC | 31 |
| CIA | 00110100 | CMA + IAC | 34 |
| STL | 00101010 | CLL + CML | 2A |

TABLE D

| Function code | Format (bits) 76543210 | Description of instruction |
|---|---|---|
| IOX | 0100XXXX | Acc $\rightarrow$ Peripheral |
| IOX | 0110XXXX | Peripheral $\rightarrow$ Acc |
| IOX | 0101XXXX | Acc $\rightarrow$ Peripheral and skip to flag |
| IOX | 0111XXXX | Peripheral $\rightarrow$ Acc and skip to flag |

TABLE E

| SYMB. NAME | ROM ADDRESS | OP. CODE | OPERANDS | HEXADEC. INSTN. |
|---|---|---|---|---|
| STARTO | 6EBA | CDN | *+4 | FDBE |
|  | 6EBC | JMPIM | SV1 + 1 | AFF2 |
|  | 6EBE | CDN | *+4 | FDC2 |
|  | 6EC0 | JMPIM | SV2 + 1 | A21F |
|  | 6EC2 | OPAL | B'00011' | 23 |
| SEARCH FOR LIMIT OF ZRM ||||
|  | 6EC4 | CLM | 0 | DC00 |
|  | 6EC6 | CLM | 1 | DC01 |
|  | 6EC8 | LACIM | X'88' | 9488 |
| POSRB | 6ECA | SNL |  | 19 |
|  | 6ECB | DAC | RB | D85F |
|  | 6ECD | LAC | 1 | D401 |
|  | 6ECF | ADDIM | X'10' | 8810 |
|  | 6ED1 | DAC | 1 | D801 |
|  | 6ED3 | CPAIM | X'50' | 8450 |
|  | 6ED5 | JMPIM | *+16 | AEE5 |
|  | 6ED7 | LAC I | 0 | D600 |
|  | 6ED9 | SPA |  | 1B |
|  | 6EDA | JMP | POSRB+3 | E9CD |
|  | 6EDC | RAL |  | 1F |
|  | 6EDD | ANDIM | X'F8' | 8CF8 |
|  | 6EDF | SUB | RB | C05F |
|  | 6EE1 | ADD | RB | C85F |
|  | 6EE3 | JMP | POSRB | E9CA |
| ZEROIZE ZRM ||||
|  | 6EE5 | CLM | 1 | DC01 |
| CLEAR3 | 6EE7 | CLM I | 0 | DE00 |
|  | 6EE9 | INC | 0 | E000 |
|  | 6EEB | LAC | 0 | D400 |
|  | 6EED | CPA | RB | C45F |
|  | 6EEF | JMPIM | STPCLM | AEF7 |
|  | 6EF1 | CPAIM | RB | 845F |
|  | 6EF3 | INC | 0 | E000 |
|  | 6EF5 | JMPIM | CLEAR3 | AEE7 |
| POSITION INDEXES ON BUF ||||
| STPCLM | 6EF7 | LACIM | BUFTAS−1 | 9411 |
|  | 6EF9 | DAC | IPREV | D822 |
|  | 6EFB | IAC |  | 30 |
|  | 6EFC | DAC | ICAR | D82A |
|  | 6EFE | LACIM | BUFTA | 9426 |
|  | 6F00 | DAC | PRELST | D84D |
| SEARCH FOR CAPACITY OF MEMORY ||||
|  | 6F02 | STA |  | 25 |
|  | 6F03 | DAC | 0 | D800 |
|  | 6F05 | ONE |  | 31 |
|  | 6F06 | DAC | 1 | D801 |
| SCRLEG | 6F08 | LAC I | 0 | D600 |
|  | 6F0A | DAC | COMOD | D842 |
|  | 6F0C | LACIM | X'55' | 9455 |
|  | 6F0E | DAC I | 0 | DA00 |
|  | 6F10 | LAC I | 0 | D600 |
|  | 6F12 | SUBIM | X'55' | 8055 |
|  | 6F14 | SZA |  | 16 |
|  | 6F15 | JMP | BIDEMI | E923 |
|  | 6F17 | INC | CONT | E045 |
|  | 6F19 | LAC | COMOD | D442 |
|  | 6F1B | DAC I | 0 | DA00 |
|  | 6F1D | INC | 1 | E001 |
|  | 6F1F | INC | 1 | E001 |
|  | 6F21 | JMPIM | SCRLEG | AF08 |
| BIDEM | 6F26 | ADD | CONT | C845 |
|  | 6F28 | DAC | DEMI | D85B |
|  | 6F5A | CAL I | INPSTA | FBD7 |
|  | 6F5C | LRL |  | 1D |
|  | 6F5D | SMA |  | 1A |
|  | 6F5E | JMP I | INI20 | EBD5 |
|  | 6F61 | JMP I | INI10 | EBF5 |
| INPSTA | 72EE | LACIM | X'E' | 940E |
|  | 72F0 | IOFF2 |  | 0E |
|  | 72F1 | IOX | '001000' | 48 |
|  | 72F2 | IOX | '100100' | 64 |
|  | 72F3 | DAC | COMOD | D842 |
|  | 72F5 | ION2 |  | 0A |
|  | 72F6 | LRR |  | 1C |
|  | 72F7 | RET |  | 03 |

What we claim is:

1. A variable configuration accounting machine adapted to be connected to a variable number and type of peripheral units, said machine comprising a central unit operable for controlling the operations of said machine and of the peripheral units connected thereto, a first read-write memory for storing data and instructions adapted to be executed for operating said central unit and said peripheral units, a second memory for permanently storing microprograms adapted to be fetched by said central unit for executing said instructions, said second memory including a first section for storing at least an initialization microprogram and a plurality of memory sections, individually selectively connectable to said central unit and each one storing microprograms for executing instructions for operating a corresponding one of said peripheral units connected to the machine in a specific configuration, said first memory comprising a first zone reserved to the central unit for execution of the microprograms and a second zone for storing data and instructions, and manual means operable for causing the execution of said initialization microprogram for initializing the machine, wherein the improvement comprises:

identifying means controlled by predetermined microinstructions of said initialization microprogram for sequentially identifying said memory sections;

storing means responsive to each identification of one of said memory sections by said identifying means for storing in said first zone a corresponding value indicating the number of memory locations corresponding to the identified section of said second memory;

and, means controlled by said storing means for defining said first zone according to said value, whereby said first memory is initialized with a first zone having a reserved number of allocated memory locations variable according to the number and type of said connected peripheral units.

2. An accounting machine according to claim 1, wherein the first memory comprises a plurality of modules, variable in number, each having a plurality of memory cells and further comprising recognizing means included in said central unit when controlled by additional microinstructions of said initialization microprogram for automatically recognizing the number of modules in the first memory to enable the machine to recognize possible overflows of said first memory.

3. An accounting machine according to claim 2, wherein said recognizing means comprises:

addressing means for addressing in succession during the initialization of the machine the last cell of each of the modules;

recording means controlled by said addressing means for recording a predetermined code combination in each of said last cells;

reading means activated by said recording means after each recording operation for reading information from each of said last cells;

comparing means for comparing the information read from each of said last cells with said predetermined code combination and for generating a control signal when the read information and the predetermined code combination are equal; and further recording means controlled by said control signal for recording a number corresponding to the number of modules addressed by said addressing means in a third register of said first memory.

4. An accounting machine according to claim 1 wherein each section of said second memory includes a memory cell for storing an indication that the associated peripheral unit is actually connected and wherein said identifying means includes a register in said first zone for storing a memory address, means for sequentially storing in said register the address of each memory cell, and reading means responsive to the address in said register for sequentially reading the indication stored in each memory cell, whereby the connected memory sections are sequentially identified by reading the identifications stored in each memory cell addressed according to the contents of said register.

5. An accounting machine according to claim 4 wherein said storing means includes another register in said first zone for storing said value, control means included in said central unit and responsive to the indication read by said reading means for defining said value, and recording means controlled by said control means for recording said value in said another register, whereby the number of memory locations corresponding to identified memory sections is recorded in said another register.

6. An accounting machien according to claim 5, wherein said indication includes information of the number of locations of said first zone required by the microprogram stored in the relevant section of said second memory, said control means includes comparing means for comparing said information read by said reading means with the value already recorded in said another register and transfer means responsive to said comparing means for causing said recording means to selectively record into said another register the higher of said information or said value, whereby said first memory is initialized with a first zone having a reserved number of locations equal to the highest number of locations required by the identified memory sections.

7. An accounting machine that is one of a series of accounting or similar machines, each one connected to a variable number and kind of peripheral units to form a variable configuration accounting system, wherein each system includes a central unit operable for controlling the operations of said system, a first read-write memory for storing data and instructions for operating said central unit, a second memory for permanently storing microprograms for executing said instructions, said second memory including a first section for storing at least an initialization microprogram, and manual means operable for causing the execution of said initialization microprogram for initializing the machine, said central unit, said first memory and said initialization microprogram being the same for all the series of systems wherein said second memory includes also for each configuration of the system a predetermined plurality of sections, each one storing microprograms for executing instructions operating predetermined peripheral units connected to the accounting machine in the specific system, said central unit including identifying means controlled by predetermined microinstructions of said initialization microprogram for sequentially identifying said predetermined memory sections, and means responsive to memory sections identified by said identifying means for defining a zone of said first memory to be reserved to the central unit for execution of the microprograms and having a number of locations corresponding to said plurality of sections of said second memory, whereby in each system said first memory is initialized with a reserved zone having a number of allocated memory locations variable according to the number and type of connected peripheral units.

8. A variable configuration accounting machine adapted to be connected to a variable number and type of peripheral units, said machine comprising a central unit including at least an accumulation register and operable for controlling the operations of said machine and of the peripheral units connected thereto, a base register controlled by said central unit and adapted to record predetermined addresses, a read-write memory connected to said central unit for storing data and instructions adapted to be executed for controlling said central unit, a data bus comprising wires for connecting said central unit to said read-write memory, said read-write memory including a memory zone reserved to the central unit and having a reserved limit of allocated memory locations variable according to the number and type of said connected peripheral units and being defined by said predetermined addresses, a read-only memory including a permanent section for storing at least an initialization microprogram manually started by an operator and a plurality of predetermined memory sections selectively connectable to said data bus according to the number and type of said connected peripheral units, each section of said predetermined memory sections storing microprograms adapted for controlling an associated peripheral unit, wherein the improvement comprises:

a memory cell in said each section for storing either a first predetermined identification code identifying that the associated peripheral unit is actually connected, or a second predetermined code having all bits at an equal logic level identifying that the associated peripheral unit is not actually connected;

addressing means controlled by predetermined microinstructions of said initialization microprogram for sequentially addressing each memory cell;

reading means responsive to said addressing means for sequentially reading into said accumulation register selectively either said first predetermined code or said second predetermined code; and means responsive to said first and second codes stored in said accumulator register for recording in said base register a predetermined address defining said reserved memory zone each time said first code stored in said accumulator register is present, whereby the reserved limit of allocated memory locations of said reserved zone is increased during initialization of the machine according to the memory sections actually connected to the machine.

* * * * *